US007478660B2

(12) United States Patent
Sernesi et al.

(10) Patent No.: US 7,478,660 B2
(45) Date of Patent: Jan. 20, 2009

(54) LABELLING AND/OR MARKING MACHINE

(75) Inventors: Marco Sernesi, Bologna (IT); Giacomo Remelli, Goito (IT); Stefano Cavallari, Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 543 days.

(21) Appl. No.: 10/539,579

(22) PCT Filed: Dec. 8, 2003

(86) PCT No.: PCT/IB03/05843

§ 371 (c)(1),
(2), (4) Date: Jun. 17, 2005

(87) PCT Pub. No.: WO2004/056658

PCT Pub. Date: Jul. 8, 2004

(65) Prior Publication Data

US 2006/0249242 A1 Nov. 9, 2006

(30) Foreign Application Priority Data

Dec. 20, 2002 (IT) .......................... BO2002A0806

(51) Int. Cl.
*B29C 65/00* (2006.01)
*B65C 9/00* (2006.01)

(52) U.S. Cl. ........................ 156/362; 156/566; 156/567

(58) Field of Classification Search ................... 156/86, 156/350, 362, 566, 567
See application file for complete search history.

(56) References Cited

U.S. PATENT DOCUMENTS

| | | | | |
|---|---|---|---|---|
| 5,858,143 | A * | 1/1999 | Bright et al. | 156/86 |
| 5,926,556 | A * | 7/1999 | Douglas et al. | 381/142 |
| 2005/0045263 | A1* | 3/2005 | Heuft et al. | 156/64 |

FOREIGN PATENT DOCUMENTS

| | | |
|---|---|---|
| DE | 19927668 | 12/2000 |
| DE | 20115480 | 5/2002 |
| EP | 1197468 | 4/2002 |
| EP | 1205388 | 5/2002 |
| FR | 2342207 | 9/1977 |
| WO | WO0158763 | 8/2001 |

* cited by examiner

*Primary Examiner*—Tu B Hoang
*Assistant Examiner*—Ayub Maye
(74) *Attorney, Agent, or Firm*—Timothy J. Klima

(57) ABSTRACT

A labelling and/or marking machine (3) comprises a carousel (4) rotatable about a vertical axis (5), equipped peripherally with a set of pedestals (8) driven by respective motors (37) and supporting single containers (2), also applicator and/or marker devices (26, 27) occupying positions along a conveying path (17) followed by the containers (2). Each pedestal (8) is flanked by a corresponding CCD image sensor (31) such as will scan the lateral surface (29) of the container (2) to detect and recognize a known outline (32) presented by the surface (29), whereupon the pedestal (8) is made to rotate through a predetermined angle and thus bring the relative container (2) into the position required by the applicator and/or marker devices (26, 27).

18 Claims, 2 Drawing Sheets

LABELLING AND/OR MARKING MACHINE

This application is the national phase of international application PCT/IB03/05843 filed Dec. 8, 2003 which designated the U.S. and that international application was published under PCT Article 21 (2) in English. This application claims priority to Italian Patent application number BO2002A 000806, filed Dec. 20, 2002.

TECHNICAL FIELD

The present invention relates to a labelling and/or marking machine.

More exactly, the invention concerns a machine serving to affix and/or apply labels and/or symbols and/or lettering to containers, generally considered, in which the containers are advanced by a conveyor equipped with devices designed to check and adjust the angular position of the selfsame containers.

BACKGROUND ART

Conventionally, in machines of the aforementioned type, containers are caused to advance by a revolving carousel that presents a disc carrying a plurality of pedestals equispaced angularly around the periphery and serving each to support a respective container; each pedestal is power-driven and rotatable about the axis of the relative container.

The path along which the containers are directed by the conveyor passes through labelling or marking stations where a fixed and predetermined portion of the lateral surface presented by the container will be offered to each such station.

To the end of controlling the angular position of the containers positioned on the pedestals so that they will always be correctly aligned when brought into the labelling or marking stations, the prior art embraces the use of optical sensors connected to a control unit piloting the operation of the motors associated with the single pedestals.

More exactly, the optical sensors in question can be photocells capable of detecting a notch presented by each container, for example, or TV cameras able to process more complex reference images.

It will be observed however that in the case of photocell type sensors, each container must be provided with a reference notch located in a clearly visible position, and there are constraints also on the geometry of the container, which for example cannot have sharp edges, whilst the external surface must be treated so as to render it non-reflective as far as possible, and with colors that will ensure the reference elements are easily read. This means a restricted range of application and limited reliability, especially with successive changes in the size, shape and specifications of containers.

In the case of TV cameras, on the other hand, it should be emphasized that this solution is penalized by excessively high cost, also by the fact that sophisticated and complex image-processing systems are required, and is therefore unsuitable for monitoring operations in machines of the type in question. In addition, it will be appreciated that a television camera is able to operate only in certain conditions of brightness and with a given level of reflection from the surface of the container.

The object of the present invention is to provide a labelling and/or marking machine unaffected by the drawbacks mentioned above.

DISCLOSURE OF THE INVENTION

The stated object is realized in a labelling and/or marking machine of which the characterizing features are as recited in one or more of the claims appended.

The invention will now be described in detail, by way of example, with the aid of the accompanying drawings, in which.

Figure 1:
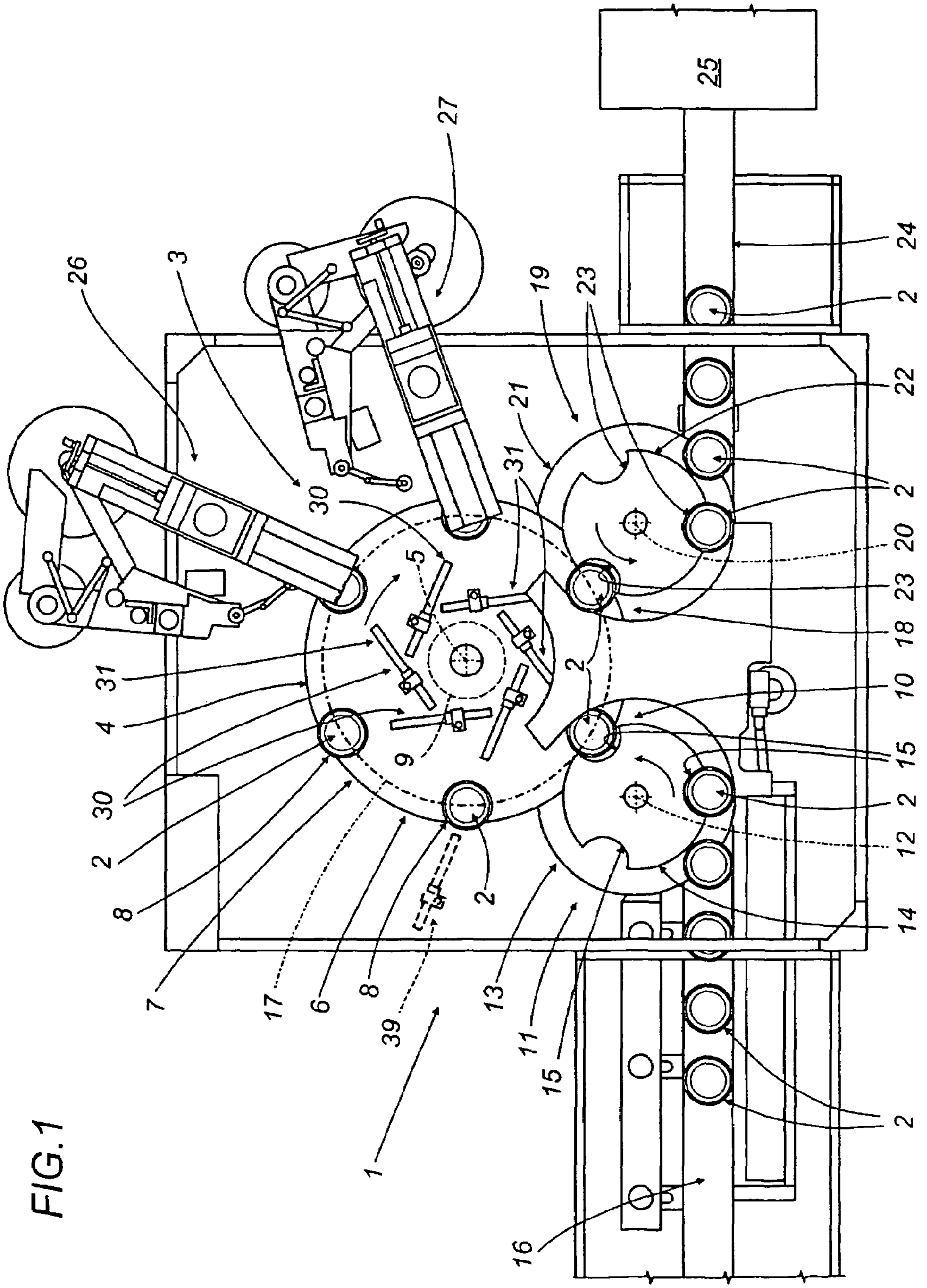
FIG. 1 illustrates a portion of a filling unit for containers comprising the labelling and/or marking machine according to the present invention, seen in a schematic plan view.

Referring to FIG. 1 of the drawings, 1 denotes a portion of a unit for filling containers 2 with liquid or powder substances. The unit 1 incorporates a labelling and/or marking machine denoted 3 in its entirety, comprising a feed conveyor 4 rotatable about a vertical axis 5 and appearing as a carousel 6 furnished at the bottom with a circular platform 7 of which the periphery presents a plurality of angularly equispaced pedestals 8, each serving to support a relative container 2.

The carousel 6, driven in rotation about the axis 5 by a respective motor 9 (see FIG. 2) and turning clockwise as viewed in FIG. 1, is positioned to receive a succession of containers 2 by way of an infeed station 10 where each container is directed onto a relative pedestal 8 by an infeed unit 11 of conventional type, rotating anticlockwise about an axis 12 parallel to the axis 5 of the carousel; the unit 11 comprises a platform 13 and, located above the platform, a disc 14 affording a plurality of peripheral recesses 15 each serving to accommodate a relative container 2 standing on the platform 13. The containers 2 arrive at the infeed unit 11 advancing in single file along a first rectilinear conveyor 16.

The containers 2 are transferred by the carousel 6 from the infeed station 10 onto a circular conveying path 17 terminating at an outfeed station 18, where they are taken up by an outfeed unit 19 of familiar type substantially identical to the aforementioned infeed unit 11 and rotatable similarly anticlockwise about an axis 20 parallel to the axis 6 of the carousel. The outfeed unit 19 comprises a platform 21 and, located above the platform, a disc 22 affording a plurality of peripheral recesses 23 each serving to accommodate a relative container 2 standing on the platform 21. The containers 2 are directed away from the outfeed unit 19 along a second rectilinear conveyor 24, singly and in succession, toward a further machine illustrated schematically as a block denoted 25.

Also indicated schematically in FIG. 1 are a first and a second applicator and/or marker device of conventional type, denoted 26 and 27 respectively, positioned alongside the final portion of the conveying path 17. The function of the devices in question, in the case of an applicator, is to affix a label (not illustrated) to a predetermined area 28 of the lateral surface 29 presented by each container 2, or in the case of a marker, to apply lettering and/or an image and/or a logo or a graphic symbol to the selfsame predetermined area 28. The devices 26 and 27 might both be label applicators, or both markers, or one might be an applicator and the other a marker.

Figure 2:
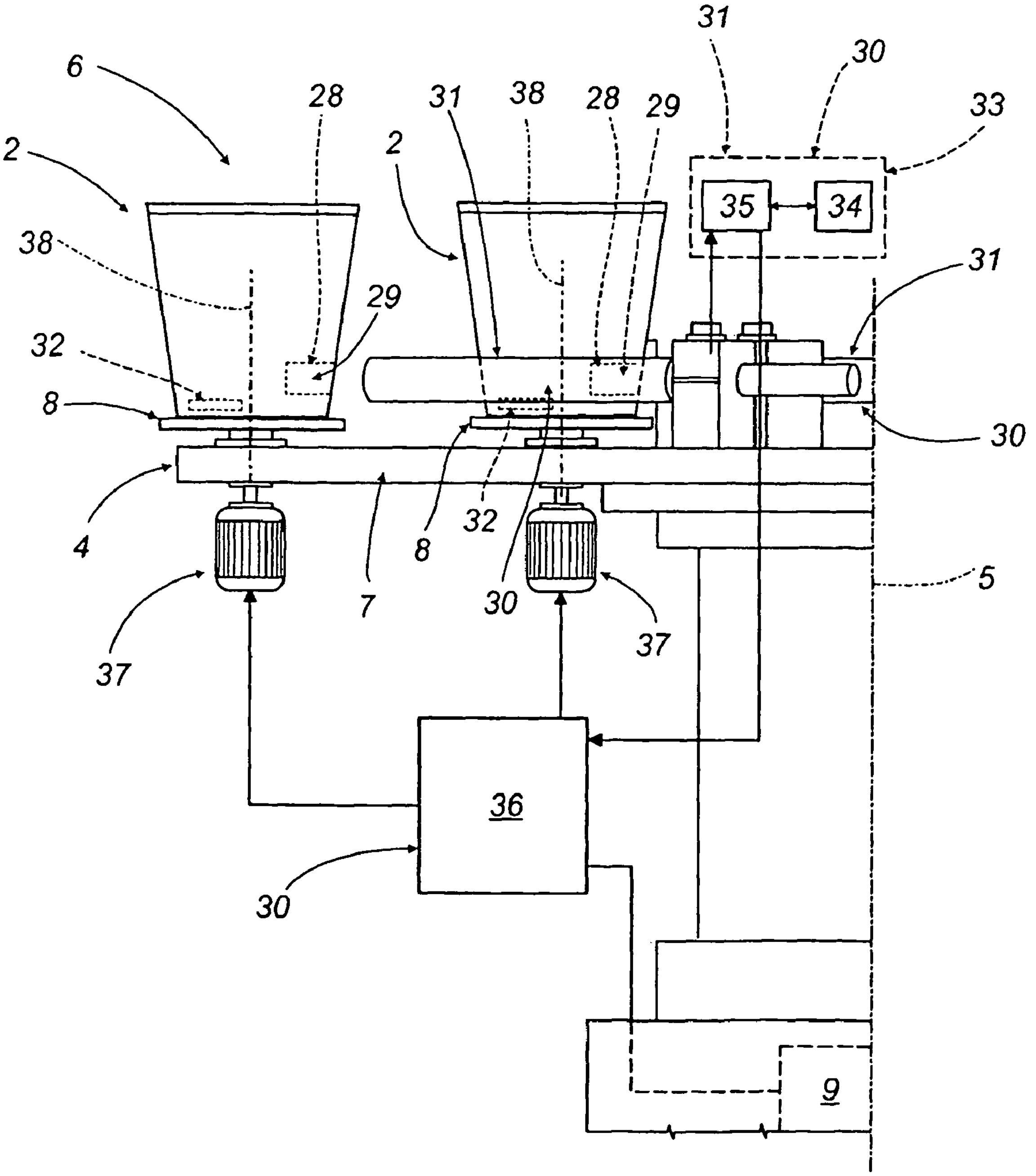
FIG. 2 is an enlarged detail of FIG. 1, viewed in a side elevation and with certain parts omitted.

As shown in FIG. 1 and 2, the rotary conveyor 4 comprises detection and control means mounted to the circular platform 7 and associated with each of the pedestals 8; such means are denoted 3D in their entirety and comprise charge coupled device ("CCD") type image sensors 31, one to each pedestal 8, able to detect and recognize a predetermined outline 32 on the lateral surface 29 of each container 2 that functions as a reference for the correct positioning of the label and/or mark.

The single CCD image sensors 31 are of conventional type, comprising a processing-module 33 that includes a memory 34 capable of identifying and storing the contours of a sample outline for reference purposes, and a sensing and control module 35 such as will compare the degree of similarity between the sample outline and the outline 32 detected on the surface 29 of the container 2.

Also forming part of the detection and control means is a master control unit, shown schematically as a block 36, connected on the input side to the processing module 33 and connected on the output side to the carousel motor 9, also to a set of motors 37 associated each with a respective pedestal 8 in such a way that the single pedestals 8 can be driven in rotation about respective axes 38.

In operation, containers 2 advancing in succession along the first rectilinear conveyor 16 arrive at the infeed station 10, where each is directed by the infeed unit 11 onto a respective pedestal 8 of the rotating circular platform 7 through the action of the motor 9, as the carousel rotates continuously about the relative axis 5.

As the container 2 is carried along the circular conveying path 17, and the respective pedestal 8 caused to rotate about its axis 38 by the motor 37, the lateral surface 29 of the container will be scanned by the detection and control means 30, and more exactly by the image sensor 31 associated with the pedestal 8. During the course of the scanning step, with the pedestal 8 rotating about its axis and thus allowing the image sensor 31 to scan the entire lateral surface 29 of the container 2, the sensor ultimately identifies the predetermined outline 32 aforementioned and returns a corresponding signal to the processing module 33, which by way of the sensing and control module 35 and the memory 34 will verify the degree of similarity between the reference sample outline and the outline 32 effectively detected on the surface 29 of the container 2.

In the event of a match between the outlines, the processing module 33 relays a corresponding signal to the master control unit 36, which in turn will send control signals to the motor 37 of the pedestal 8 supporting the scanned container 2 in such a way as to rotate the selfsame pedestal 8 through a given angle and bring it into a position corresponding to the position selected and programmed by way of the applicator and/or marker devices 26 and 27.

It will be observed that the containers 2 can be brought to bear alongside the applicator and/or marker devices 26 and 27 with the pedestals 8 either stationary, or continuing to rotate in one or other direction, as long as the aforementioned area 28 of the lateral surface 29 and the application and/or marking position are certain to coincide.

Finally, the detection and control means might consist in a single sensor 39 occupying a fixed position relative to the conveyor 4, in which case the conveyor 4 would be driven intermittently by the motor 9 so that the sensor 39 can scan the lateral surface 29 of each container 2 in turn.

The invention claimed is:

1. A labeling or marking machine comprising:

a feed conveyor rotatable about a vertical axis and equipped peripherally with a plurality of pedestals supporting single containers;

drive means associated respectively with the conveyor, by which the containers are directed along a predetermined conveying path, and with the single pedestals in such a way that each pedestal is driven in rotation about a respective vertical axis;

applicator or marker means occupying positions along the predetermined conveying path; and means by which to detect and control an angular position of the containers, the means by which to detect and control comprising a plurality of charge coupled device ("CCD") image sensors mounted rigidly to the rotating feed conveyor, each associated with a relative pedestal supporting a container and each capable of detecting and recognizing predetermined outlines presented by the containers.

2. A machine as in claim 1, wherein the CCD image sensors comprise a memory by which to store at least a shape of one reference sample outline, and respective sensing and control means serving to measure a degree of similarity between the reference sample outline and the detected outline.

3. A machine as in claim 2, comprising a master control unit connected on an input side to the CCD image sensor, and on an output side to the drive means associated respectively with the conveyor and with each of the pedestals.

4. A machine as in claim 3, comprising a CCD image sensor occupying a fixed position relative to the rotating feed conveyor.

5. A machine as in claim 1, wherein the rotating conveyor is set in motion intermittently by respective drive means.

6. A machine as in claim 1, wherein the rotating conveyor is set in motion continuously by respective drive means.

7. A machine as in claim 3, wherein the master control unit receives a signal from the CCD image sensor indicating an angular position of the predetermined outline presented by a respective container relative to the conveyor, and responds by sending a control signal to the drive means associated with the pedestal supporting a container, such as will cause the pedestal to rotate through a predetermined angle and into a position coinciding with a predetermined position programmed by way of the labeling or marking means.

8. A machine as in claim 7, wherein the master control unit is designed to respond, once the pedestal has reached the predetermined position programmed by way of the labeling or marking means, by deactivating the drive means associated with the pedestal.

9. A machine as in claim 8, wherein the applicator means positioned along the predetermined conveying path comprise at least one device such as will affix a label to a predetermined area of a lateral surface presented by each container.

10. A machine as in claim 8, wherein the marker means positioned along the predetermined conveying path comprise at least one device such as will apply at least one of lettering, and an image or a logo or graphic symbol to a predetermined area of the lateral surface presented by each container.

11. A machine as in claim 1, comprising a master control unit connected on an input side to the CCD image sensor, and on an output side to the drive means associated respectively with the conveyor and with each of the pedestals.

12. A machine as in claim 11, comprising a CCD image sensor occupying a fixed position relative to the rotating feed conveyor.

13. A machine as in claim 12, wherein the rotating conveyor is set in motion intermittently by respective drive means.

14. A machine as in claim 11, comprising a plurality of CCD image sensors mounted rigidly to the rotating feed conveyor, each associated with a relative pedestal supporting a container.

15. A machine as in claim 14, wherein the rotating conveyor is set in motion intermittently by respective drive means.

16. A machine as in claim 4, wherein the rotating conveyor is set in motion intermittently by respective drive means.

17. A machine as in claim 1, wherein the applicator means positioned along the predetermined conveying path comprise at least one device such as will affix a label to a predetermined area of a lateral surface presented by each container.

18. A machine as in claim 1, wherein the marker means positioned along the predetermined conveying path comprise at least one device such as will apply lettering and/or an image and/or a logo or graphic symbol to a predetermined area of a lateral surface presented by each container.

* * * * *